(No Model.)
H. UNWIN.
APPARATUS FOR INSERTING RUBBER, &c., INTO GROOVED TIRES.
No. 424,084. Patented Mar. 25, 1890.
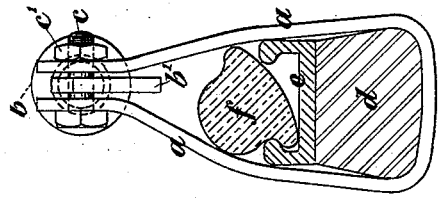
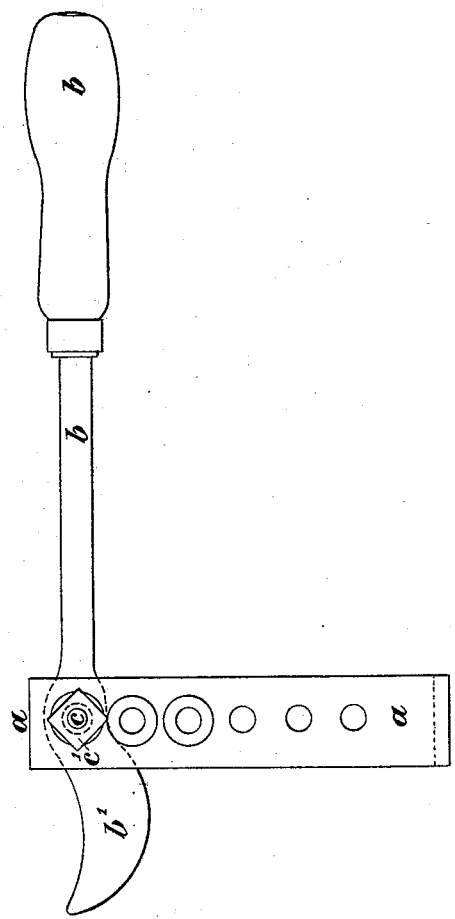
Witnesses.
E. J. Griswold
John Revell
Inventor.
Howard Unwin
By his attorneys
Howson and Howson

UNITED STATES PATENT OFFICE.

HOWARD UNWIN, OF WESTMINSTER, COUNTY OF MIDDLESEX, ENGLAND, ASSIGNOR TO THE SHREWSBURY & TALBOT CAB AND NOISELESS TYRE COMPANY, (LIMITED,) OF SAME PLACE.

APPARATUS FOR INSERTING RUBBER, &c., INTO GROOVED TIRES.

SPECIFICATION forming part of Letters Patent No. 424,084, dated March 25, 1890.

Application filed January 8, 1890. Serial No. 336,248. (No model.)

*To all whom it may concern:*

Be it known that I, HOWARD UNWIN, a subject of the Queen of Great Britain and Ireland, and residing at Westminster, in the county of Middlesex, England, have invented an Improved Apparatus for Inserting Rubber, &c., into Grooved Tires, of which the following is a specification.

This invention relates to the construction of a simple and convenient tool designed for the purpose of inserting lengths of india-rubber or other yielding substances into the dovetail or other undercut groove of the metal tires in the manufacture, repairing, or renewal of what are known as "noiseless tires" for the wheels of cabs, carriages, and other vehicles.

The invention consists, principally, of three parts—namely, a lever formed into a suitable tool at one end and a handle at the other, a bolt forming a fulcrum for the same, and a strap or loop by means of which it can be attached to any part of the felly of the wheel. The strap is formed from a piece of leather or other strong, flexible, non-elastic material, and is provided with several holes at or near each end, some or all of which are protected or strengthened with metal eyelets. This strap is of such a length that it will pass round the felly of the wheel and allow the bolt to pass through two of the holes (one near each end) and through the hole in the lever, so as to form a fulcrum for the latter at such a distance from the tire as will enable the tool to be used with advantage for pressing or forcing the india-rubber or other yielding substance into the groove of the tire.

In the annexed drawings, Figure 1 is a side view of the improved tool, $a$ being the loop or strap, $b$ the lever, (the end $b'$ of which forms the tool,) and $c$ is a screw-bolt which forms the fulcrum of the said lever. Fig. 2 shows the way in which the tool is used, being an end view of the tool, and showing the felly $d$, the metal tire $e$, and the india-rubber tire $f$ of a wheel in section.

To attach the tool to the required part of the felly, the nut $c'$ is unscrewed, and, one end of the strap $a$ being passed round the felly $d$, the proper hole is passed over the end of the bolt $c$ and the nut $c'$ screwed tight again, and the lever $b$ can then be used for forcing in the rubber $f$, the flexibility of the strap $a$ allowing the tool to be manipulated in the requisite manner.

I declare that what I claim is—

The improved apparatus for the purposes aforesaid, consisting of the combination of a lever, (one end of which is formed into a suitable tool,) a leather or other flexible strap, and a removable bolt connecting the two together and forming a fulcrum for the lever, substantially as hereinbefore described, and illustrated by the drawings annexed.

In testimony whereof I have signed my name to this specification in the presence of two subscribing witnesses.

HOWARD UNWIN.

Witnesses:
ALFRED BURGESS,
W. F. WARD.